(12) United States Patent
Seol et al.

(10) Patent No.: US 10,490,803 B2
(45) Date of Patent: Nov. 26, 2019

(54) POSITIVE ELECTRODE FOR LITHIUM SECONDARY BATTERY AND METHOD FOR PREPARING THE SAME

(71) Applicant: LG Chem, Ltd., Seoul (KR)

(72) Inventors: Jong-Heon Seol, Daejeon (KR); Jin-Young Son, Daejeon (KR); Hyung-Suk Cho, Daejeon (KR); Sin-Young Jung, Daejeon (KR); Yoon-Jung Choi, Daejeon (KR); Yo-Jin Kim, Daejeon (KR); Je-Young Kim, Daejeon (KR); Sung-Joon Park, Daejeon (KR); Jung-Keun Yoo, Daejeon (KR); Sang-Hoon Choy, Daejeon (KR)

(73) Assignee: LG Chem, Ltd. (KR)

( * ) Notice: Subject to any disclaimer, the term of this patent is extended or adjusted under 35 U.S.C. 154(b) by 154 days.

(21) Appl. No.: 15/636,920

(22) Filed: Jun. 29, 2017

(65) Prior Publication Data
US 2018/0006289 A1 Jan. 4, 2018

(30) Foreign Application Priority Data
Jul. 1, 2016 (KR) .................. 10-2016-0083654

(51) Int. Cl.
*H01M 4/00* (2006.01)
*H01M 4/04* (2006.01)
(Continued)

(52) U.S. Cl.
CPC ........... *H01M 4/04* (2013.01); *H01M 4/0404* (2013.01); *H01M 4/13* (2013.01); *H01M 4/139* (2013.01);
(Continued)

(58) Field of Classification Search
CPC ...... H01M 4/04; H01M 4/0404; H01M 4/668; H01M 4/667; H01M 4/139; H01M 4/13;
(Continued)

(56) References Cited

U.S. PATENT DOCUMENTS 5,578,396 A * 11/1996 Fauteux ............... H01M 4/66
429/209
2007/0248883 A1* 10/2007 Oda ...................... H01M 4/525
429/231.1
(Continued)

FOREIGN PATENT DOCUMENTS

JP 2010108703 A 5/2010
JP 2013026063 A 2/2013

*Primary Examiner* — Nicholas P D'Aniello
(74) *Attorney, Agent, or Firm* — Lerner, David, Littenberg, Krumholz & Mentlik, LLP (57) ABSTRACT

Disclosed is a positive electrode for a lithium secondary battery which uses a positive electrode active material containing secondary particles with a relatively weak particle strength to improve the adhesion between a positive electrode mixture layer and a current collector, and the positive electrode includes a positive electrode current collector; a primer coating layer including a first polymer binder and a first conductive material, having surface roughness ($R_a$) of 85 nm to 300 nm and formed on at least one surface of the positive electrode current collector; and a positive electrode mixture layer formed on an upper surface of the primer coating layer and including a positive electrode active material containing secondary particles with a compressive breaking strength of 1 to 15 MPa, a second polymer binder and a second conductive material.

11 Claims, 5 Drawing Sheets

(51) Int. Cl.
*H01M 4/62* (2006.01)
*H01M 4/88* (2006.01)
*H01M 10/0525* (2010.01)
*H01M 4/13* (2010.01)
*H01M 4/139* (2010.01)
*H01M 4/66* (2006.01)
*H01M 4/02* (2006.01)
*H01M 10/052* (2010.01)

(52) U.S. Cl.
CPC ........... *H01M 4/622* (2013.01); *H01M 4/667* (2013.01); *H01M 4/668* (2013.01); *H01M 4/8828* (2013.01); *H01M 4/8896* (2013.01); *H01M 10/0525* (2013.01); *H01M 4/663* (2013.01); *H01M 10/052* (2013.01); *H01M 2004/021* (2013.01); *H01M 2004/028* (2013.01)

(58) Field of Classification Search
CPC ............... H01M 4/8828; H01M 4/622; H01M 10/0525; H01M 4/8896; H01M 2004/021; H01M 10/052; H01M 4/663; H01M 2004/028
See application file for complete search history.

(56) References Cited

U.S. PATENT DOCUMENTS

2008/0131779 A1     6/2008   Kami et al.
2013/0143126 A1*   6/2013   Jung ...................... H01B 1/122
                                                                  429/231.6
2014/0349171 A1    11/2014   Kim et al.

* cited by examiner

POSITIVE ELECTRODE FOR LITHIUM SECONDARY BATTERY AND METHOD FOR PREPARING THE SAME

CROSS-REFERENCE TO RELATED APPLICATIONS

The present application claims priority to Korean Patent Application No. 10-2016-0083654 filed on Jul. 1, 2016 in the Republic of Korea, the disclosures of which are incorporated herein by reference.

TECHNICAL FIELD

The present disclosure relates to a positive electrode for a lithium secondary battery and a method for preparing the same.

BACKGROUND ART

Along with the technology development and the increased demand for mobile devices, the demand for secondary batteries as energy sources is rapidly increasing. Among the secondary batteries, a lithium secondary battery having a high energy density and voltage, a long cycle life, and a low discharge rate is commercialized and widely used.

The lithium secondary battery is configured so that a non-aqueous electrolyte containing a lithium salt is impregnated in an electrode assembly in which a porous separator is interposed between a positive electrode and a negative electrode. The positive electrode and the negative electrode are respectively fabricated by applying slurry containing an electrode active material on an electrode current collector thereof, followed by a rolling process.

While the positive electrode is being prepared, the slurry is pressed toward the current collector in the rolling process. In this process, a portion of the surface of the positive electrode current collector is dug concavely by positive electrode active material particles contained in the slurry, and accordingly a contact area between the positive electrode mixture layer and the positive electrode current collector increases, thereby improving the adhesion between the positive electrode mixture layer and the positive electrode current collector.

This positive electrode active material is made using secondary particles. However, since the secondary particles collapse during the electrode fabricating process to have a shape of a primary particle, the surface of the positive electrode current collector is not dug, and thus the contact area between the positive electrode mixture layer and the positive electrode current collector is not increased, thereby lowering the adhesion to some degree.

Also, if a polymer binder is used in a large amount in order to improve the adhesion between the positive electrode mixture layer and the positive electrode current collector, the amount of the positive electrode active material is relatively decreased, which may deteriorate the battery capacity or increase the resistance.

DISCLOSURE

Technical Problem

The present disclosure is directed to providing a positive electrode for a lithium secondary battery, which may improve the adhesion between a positive electrode mixture layer and a positive electrode current collector in a positive electrode using a positive electrode active material with a relatively weak particle strength, and a method for preparing the same.

Technical Solution

In one aspect of the present disclosure, there is provided a positive electrode for a lithium secondary battery, comprising: a positive electrode current collector; a primer coating layer including a first polymer binder and a first conductive material, having surface roughness ($R_a$) of 85 nm to 300 nm and formed on at least one surface of the positive electrode current collector; and a positive electrode mixture layer formed on an upper surface of the primer coating layer and including a positive electrode active material containing secondary particles with a compressive breaking strength of 1 to 15 MPa, a second polymer binder and a second conductive material.

Preferably, the surface roughness of the primer coating layer may be 90 nm to 200 nm, and the secondary particles may have a compressive breaking strength of 4 to 11 MPa.

Preferably, the secondary particles may be aggregates of primary particles, the primary particles may have an average particle diameter of 0.2 to 1.0 μm, and the secondary particles may have an average particle diameter of 3.1 to 22.4 μm.

Preferably, the primer coating layer may have a thickness of 0.3 μm to 1 μm.

Preferably, the first conductive material and the first polymer binder may be included at a weight ratio of 0.8:1 to 2:1.

Preferably, the first polymer binder may be an acrylate-based polymer.

Preferably, the second polymer binder may be at least one selected from the group consisting of polyvinylidene fluoride-hexafluoropropylene, polyvinylidene fluoride, polyacrylonitrile, polymethyl methacrylate, styrene-butadiene rubber and carboxymethyl cellulose.

Preferably, the first conductive material may be a carbon-based material.

Preferably, the positive electrode mixture layer may have a compressive density of 1.8 $g/cm^3$ to 4.4 $g/cm^3$.

In addition, in another aspect of the present disclosure, there is also provided a method for preparing a positive electrode for a lithium secondary battery, comprising: preparing slurry for forming a primer coating layer, which includes a first polymer binder, a first conductive material and a first solvent; preparing a positive electrode active material slurry including a second polymer binder, a positive electrode active material containing secondary particles with a compressive breaking strength of 1 to 15 MPa, a second conductive material, and a second solvent; forming a primer coating layer by coating and drying the slurry for forming a primer coating layer on at least one surface of the positive electrode current collector; and forming a positive electrode active material layer by coating and drying the positive electrode active material slurry on an upper surface of the primer coating layer where the slurry for forming a primer coating layer is coated, wherein the first solvent is an organic solvent and the second solvent is a water-based solvent, or the first solvent is a water-based solvent and the second solvent is an organic solvent.

Preferably, the organic solvent may be at least one selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate and butyl propionate, and the water-based solvent is at least one selected from the group consisting of water, methanol, ethanol, ethylene glycol, diethylene glycol and glycerol.

Advantageous Effects

The positive electrode for a lithium secondary battery according to the present disclosure may improve the adhesion between the positive electrode mixture layer and the positive electrode current collector by increasing a contact area therebetween, even though the positive electrode active material has relatively weak particle strength.

DESCRIPTION OF DRAWINGS

The accompanying drawings are provided for further understanding of the present disclosure and serve to explain the principle of the present disclosure together with the detailed description, without limiting the scope of the present disclosure thereto. Meanwhile, the shapes, sizes, scales or ratios of elements in the accompanying drawings may be exaggerated to emphasize features more clearly.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

When a positive electrode active material containing secondary particles with a compressive breaking strength of 1 MPa to 10 MPa is used, the positive electrode active material may not maintain the shape of the secondary particles during a rolling process when the positive electrode is being prepared. As a result, the surface of the positive electrode current collector is not dug, and thus a contact area between a positive electrode mixture layer and a positive electrode current collector may not be increased, thereby deteriorating the adhesion to some extent.

Figure 1A:
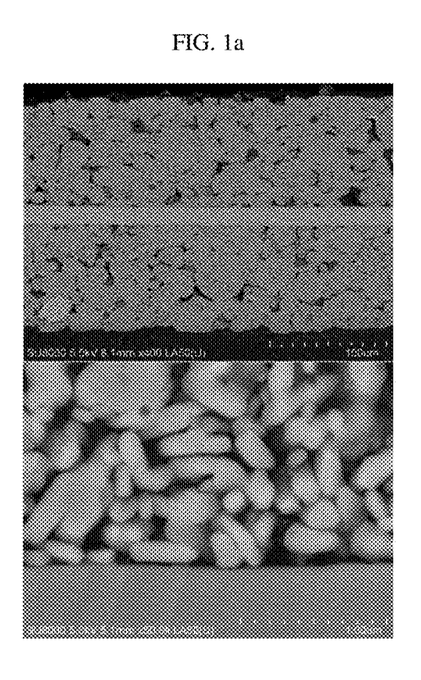
FIGS. 1a, 1b and 2 are SEM photographs showing a section of an existing positive electrode.
Figure 1B:
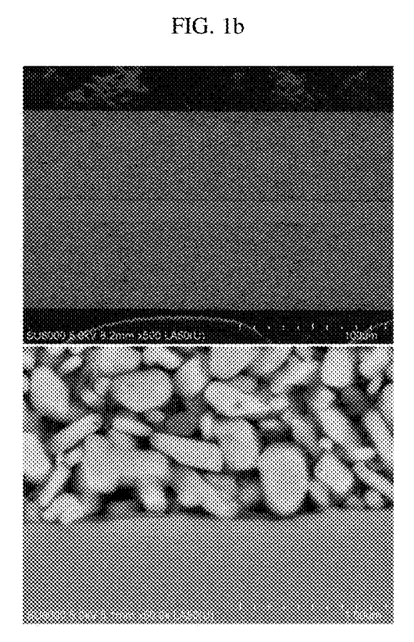
Figure 2:
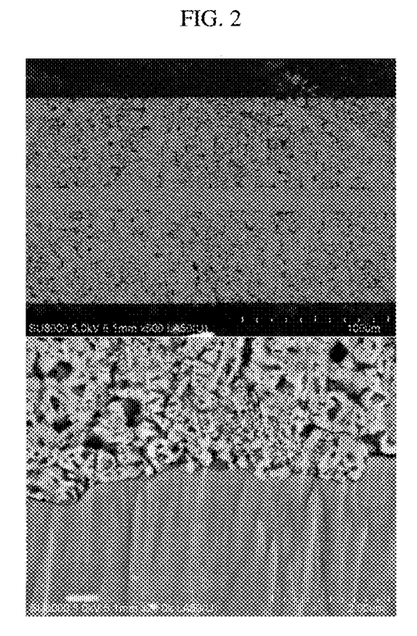

FIGS. 1a, 1b and 2 are SEM photographs showing a section of an existing positive electrode.

In detail, FIG. 1a is a SEM photograph showing a state where a positive electrode active material slurry containing secondary particles made of lithium iron phosphate and having a compressive breaking strength of 10 MPa or less is coated on an aluminum foil. FIG. 1b is a SEM photograph showing a state after the positive electrode of FIG. 1a is rolled. FIG. 2 is a SEM photograph showing a positive electrode where a positive electrode mixture layer containing secondary particles made of lithium iron phosphate and having a compressive breaking strength of 50 MPa is formed on both surfaces of an aluminum foil. Referring to FIGS. 1a, 1b and 2, it may be understood that the surface of the positive electrode current collector is not dug after the rolling process, when a positive electrode active material with a relatively weak compressive breaking strength is used.

In the present disclosure, a primer coating layer is provided on at least one surface of the positive electrode current collector so that the surface of the positive electrode current collector is modified to have roughness of a predetermined range, thereby increasing the contact area between the positive electrode mixture layer and the positive electrode current collector and thus improving the adhesion.

The positive electrode of the present disclosure includes a positive electrode current collector, and a positive electrode mixture layer formed on at least one side of the positive electrode current collector and having a positive electrode active material, a second polymer binder and a second conductive material, similar to a general positive electrode for a lithium secondary battery.

The positive electrode active material according to an embodiment of the present disclosure includes secondary particles having a compressive breaking strength of 1 to 15 MPa, preferably a compressive breaking strength of 4 to 11 MPa. The secondary particles are aggregates of primary particles, where the primary particles may have an average particle diameter of 0.2 to 1.0 μm and the secondary particles may have an average particle diameter of 3.1 to 22.4 μm.

For reference, the compressive breaking strength of the secondary particles may be controlled by the particle structure, which is an intrinsic property of the primary particles that form the secondary particles, or by the density at which the primary particles are aggregated.

Regarding the compressive breaking strength of the secondary particles of the positive electrode active material, if the numerical range is satisfied, the prepared positive electrode active material slurry has an appropriate solid content and thus improves the coating quality of the positive electrode active material.

Meanwhile, if the compressive breaking strength is lower than the lower limit of the numerical range, prepared the positive electrode active material slurry has a lowered solid content, an increased viscosity and deteriorated coating processing. Also, after the positive electrode active material slurry is coated on the positive electrode current collector, the amount of solvent to be volatized is increased, and thus the coating and drying processes become very complicated. If the compressive breaking strength is higher than the upper limit of the numerical range, there is no improvement even though the compressive breaking strength exceeds the upper limit, which is cost-uneconomical, and the thickness of the positive electrode mixture layer is increased to lower the energy density of the battery, which is an adverse effect.

The positive electrode active material may be lithium titanate (LTO) or lithium iron phosphate (LFP).

The compressive breaking strength (St [MPa]) of the present disclosure was measured using a micro compression tester (MCT-W), manufactured by Shimadzu, and was calculated using the Hiramatsu formula (Japanese Mining Journal, Vol. 81, No. 932, 1965 December, pp. 1024-1030]).

$$St=2.8P/\pi d^2$$

(P: load applied to the particles [N], d: particle diameter (mm))

Specific measurement conditions are as follows.
1. Test indenter: FLAT50
2. Measurement mode: Compression test
3. Load applied to the particles: 20.00 [mN]
4. Load speed: 0.892405 [mN]/sec The positive electrode according to an embodiment of the present disclosure includes a first polymer binder and a first conductive material, has a surface roughness ($R_a$) of 85 nm to 300 nm, and further includes a primer coating layer formed on at least one side of the positive electrode current collector, thereby improving the adhesion between the positive electrode mixture layer and the positive electrode current collector. If the surface roughness ($R_a$) is less than 85 nm, it is impossible to provide a sufficient surface roughness value, and the adhesion may not be improved to a level similar to that of a positive electrode current collector having no primer coating layer. If the surface roughness ($R_a$) is larger than 300 nm, the surface roughness becomes larger the primary particles of the positive electrode active material, and thus the adhesion may not be improved by means of the surface roughness. Preferably, the surface roughness ($R_a$) may be 90 nm to 200 nm.

If the secondary particles of the present disclosure having a relatively weak compressive breaking strength of 1 MPa to 15 MPa are used, the secondary particles may not maintain their shape in the rolling process while the positive electrode is being prepared, but are crushed to form primary particles. At this time, if the primer coating layer of the present disclosure is not provided, the positive electrode mixture layer and the positive electrode current collector directly contact each other. However, since the surface of the positive electrode current collector is not dug by the primary particles, the contact area between the positive electrode mixture layer and the positive electrode current collector is not increased, and thus the adhesion between the positive electrode mixture layer and the positive electrode current collector becomes weakened to some extent.

However, if the primer coating layer having a surface roughness ($R_a$) of 85 nm to 300 nm is provided as in the present disclosure, the crushed primary particles are interposed between the uneven portions formed on the surface of the primer coating layer, and thus the contact area between the positive electrode active material and the current collector is increased to improve the adhesion.

In other words, even though the secondary particles having a relatively high compressive breaking strength (exceeding 15 MPa), which are fabricated relatively difficultly, are not used, it is possible to improve the adhesion between the positive electrode active material and the current collector as described above only if the primer coating layer having the surface roughness of the present disclosure is provided.

The surface roughness ($R_a$) of the present disclosure was measured using an optical profiler manufactured by Nanosystems. Specific measurement examples are as follows.

1. By using the optical profiler, Topo images were obtained by selecting five measurement areas for each sample at a measurement magnification of ×500.
2. Experiments were carried out in the range of 20 μm above and below a reference plane, and only linear recovery and triangular wave recovery were performed.
3. The surface roughness was analyzed on the entire 2D Topo images, and $R_a$ was obtained as a representative value.

The positive electrode current collector is not specially limited as long as it has high conductivity without causing a chemical change in the corresponding battery. For example, the positive electrode current collector may use stainless steel, aluminum, nickel, titanium, sintered carbon, or aluminum or stainless steel surface-treated with carbon, nickel, titanium, silver, or the like. Preferably, the positive electrode current collector may use aluminum.

The primer coating layer may contain a first polymer binder and a first conductive material and have a thickness of 0.3 μm to 1 μm.

The first conductive material ensures the surface roughness of the primer coating layer and provides conductivity to the positive electrode, and the first conductive material is not specially limited as long as it has electrical conductivity without causing a chemical change in the corresponding battery. For example, the first conductive material may use graphite such as natural graphite and artificial graphite; carbon black such as carbon black, acetylene black, Ketjen black, channel black, furnace black, lamp black, and thermal black; conductive fibers such as carbon fibers and metal fibers; metal powder such as carbon fluoride, aluminum and nickel powder; conductive whiskey such as zinc oxide and potassium titanate; conductive metal oxide such as titanium oxide; conductive materials such as polyphenylene derivatives; and the like.

The first polymer binder is used to bond and fix conductive material particles so that the first conductive material may realize surface roughness, and may use an acrylate-based polymer. The acrylate-based polymer may include at least one selected from the group consisting of 2-ethylhexyl acrylate, methyl methacrylate, ethyl methacrylate, n-propyl methacrylate, i-propyl methacrylate, n-butyl methacrylate, acrylamide, 1,4-benzenedicarboxylic acid, and acrylonitrile.

The first conductive material and the first polymer binder may be included at a weight ratio of 0.8:1 to 2:1. If the weight ratio is satisfied, the surface roughness of the primer coating layer may be achieved, and it is possible to prevent the primer coating layer from being separated.

In addition, the primer coating layer according to another embodiment of the present disclosure may include carboxymethyl cellulose and a first conductive material. By using carboxymethyl cellulose, which may serve as both a thickener and as a binder, the surface roughness of the primer coating layer may be ensured.

The positive electrode mixture layer includes a positive electrode active material, a second polymer binder, and a second conductive material.

The second polymer binder is a component which assists in bonding of the positive electrode active material and the second conductive material and bonding to the positive electrode current collector, and may use at least one selected from the group consisting of polyvinylidene fluoride-hexafluoropropylene, polyvinylidene fluoride, polyacrylonitrile, polymethyl methacrylate, styrene-butadiene rubber and carboxymethyl cellulose.

The second conductive material is not specially limited as long as it has electrical conductivity without causing a chemical change in the corresponding battery. For example, the second conductive material may use graphite such as natural graphite and artificial graphite; carbon black such as carbon black, acetylene black, Ketjen black, channel black, furnace black, lamp black, and thermal black; conductive fibers such as carbon fibers and metal fibers; metal powder such as carbon fluoride, aluminum and nickel powder; conductive whiskey such as zinc oxide and potassium titanate; conductive metal oxide such as titanium oxide; conductive materials such as polyphenylene derivatives; and the like.

Also, the positive electrode mixture layer according to another embodiment of the present disclosure may have a compressive density of 1.8 g/cm$^3$ to 4.4 g/cm$^3$.

In addition, according to another aspect of the present disclosure, there is provided a method for preparing a positive electrode for a lithium secondary battery, which includes preparing slurry for forming a primer coating layer, which includes a first polymer binder, a first conductive material and a first solvent; preparing a positive electrode active material slurry including a second polymer binder, a positive electrode active material containing secondary particles with a compressive breaking strength of 1 to 15 MPa, a second conductive material, and a second solvent; forming a primer coating layer by coating and drying the slurry for forming a primer coating layer on at least one surface of the positive electrode current collector; and forming a positive electrode active material layer by coating and drying the positive electrode active material slurry on an upper surface of the primer coating layer where the slurry for forming a primer coating layer is coated.

In the method for preparing a positive electrode for a lithium secondary battery according to the present disclosure, the slurry for forming the primer coating layer and the positive electrode active material slurry use different solvents. In other words, the first solvent may be an organic solvent and the second solvent may be a water-based solvent, or the first solvent may be a water-based solvent and the second solvent may be an organic solvent. If the first solvent and the second solvent use the same solvent, the structure of the primer coating layer having the surface roughness of 85 nm to 300 nm is collapsed, and thus it is difficult to improve the adhesion between the positive electrode current collector and the positive electrode mixture layer.

The water-based solvent may use water, methanol, ethanol, ethylene glycol, diethylene glycol, glycerol, or mixtures thereof.

The organic solvent may use a known solvent such as cyclic carbonate-based solvents with or without a halogen substituent; linear carbonate-based solvents; ester-based solvents, nitrile-based solvents, phosphate-based solvents, or mixtures thereof. For example, the organic solvent may use propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate, or mixtures thereof.

When a water-based solvent is used as the solvent, the slurry may further contain a thickening agent. The thickening agent may include any one selected from the group consisting of cellulosic compounds, polyvinyl alcohol, polyacrylic acid, and mixtures thereof.

Hereinafter, the present disclosure will be described in detail through examples. The examples of the present disclosure, however, may take several other forms, and the scope of the present disclosure should not be construed as being limited to the following examples. The examples of the present disclosure are provided to more fully explain the present disclosure to those having ordinary knowledge in the art to which the present disclosure pertains.

EXAMPLE 1

10 wt % of acetylene black, 10 wt % of 2-ethylhexyl acrylate, 1 wt % of carboxymethyl cellulose and 79 wt % of water were mixed to prepare slurry for forming a primer coating layer.

97 wt % of lithium iron phosphate serving as a positive electrode active material and in the form of secondary particles with a compressive breaking strength of 5 MPa, 0.5 wt % of CNT and 2.5 wt % of PVdF (binder) were mixed and dispersed in NMP to prepare a positive electrode active material slurry.

The slurry for forming a primer coating layer was coated on one surface of an aluminum foil and dried at 70 to 80° C. to form a primer coating layer. The surface roughness of the primer coating layer was 91.2 nm, and the positive electrode mixture slurry was coated on an upper surface of the primer coating layer and dried at 130° C. After that, the resultant product was rolled using a roll-type press and dried in a vacuum oven at 100° C. for 10 hours or more to prepare a positive electrode.

EXAMPLE 2

An positive electrode was prepared in the same way as Example 1, except that 10 wt % of acetylene black, 20 wt % of 2-ethylhexyl acrylate, 1 wt % of carboxymethyl cellulose and 69 wt % of water were mixed as the slurry for forming a primer coating layer, and the surface roughness of the primer coating layer was 84.7 nm.

EXAMPLE 3

An positive electrode was prepared in the same way as Example 1, except that 6 wt % of acetylene black, 4 wt % of carboxymethyl cellulose and 90 wt % of water were mixed as the slurry for forming a primer coating layer, and the surface roughness of the primer coating layer was 102.6 nm.

COMPARATIVE EXAMPLE 1

97 wt % of lithium iron phosphate serving as a positive electrode active material and in the form of secondary particles with a compressive breaking strength of 5 MPa, 0.5 wt % of CNT and 2.5 wt % of PVdF (binder) were mixed and dispersed in NMP to prepare a positive electrode active material slurry.

An aluminum foil was prepared, and the surface roughness of the aluminum foil was 84.7 nm.

The positive electrode active material slurry was coated on one surface of the aluminum foil and dried at 130° C. After that, the resultant product was rolled using a roll-type press and dried in a vacuum oven at 100° C. for 10 hours or more to prepare a positive electrode.

COMPARATIVE EXAMPLE 2

8 wt % of acetylene black, 2 wt % of imide-amide-based binder and 90 wt % of ethylene carbonate were mixed to prepare slurry for forming a primer coating layer.

97 wt % of lithium iron phosphate serving as a positive electrode active material and in the form of secondary particles with a compressive breaking strength of 5 MPa, 0.5 wt % of CNT and 2.5 wt % of PVdF (binder) were mixed to prepare a positive electrode active material slurry.

The slurry for forming a primer coating layer was applied on one surface of an aluminum foil. The surface roughness of the primer coating layer was 311.6 nm, and the positive electrode mixture slurry was coated on an upper surface of the primer coating layer and dried at 130° C. After that, the resultant product was rolled using a roll-type press and dried in a vacuum oven at 100° C. for 10 hours or more to prepare a positive electrode.

Measurement of an Electrode Adhesion

Electrode adhesion was measured using the positive electrodes prepared according to Examples 1 to 3 and Comparative Examples 1 and 2. The specific measurement method is as follows.

1. Perform blanking to the electrode into a size of 10 mm×180 mm.
2. Attach a double-sided tape on a slide glass and place the electrode thereon.
3. Adhere 5 times using a 2 kg roller.
4. Measure a peeling force from the electrode and the slide glass by using UTM (produced by TA). When peeling, peeling is performed at 200 mm/min, and the slide glass and the electrode are measured at an angle of 90 degrees.

The results measured according to the above method are shown in Table 1 below.

TABLE 1

|  | Example 1 | Example 2 | Example 3 | Comparative Example 1 | Comparative Example 2 |
| --- | --- | --- | --- | --- | --- |
| Electrode adhesion (gf/cm) | 10.8 | 7.9 | 32.0 | 4.7 | 3.0 |

Measurement of Resistance

Figure 3:
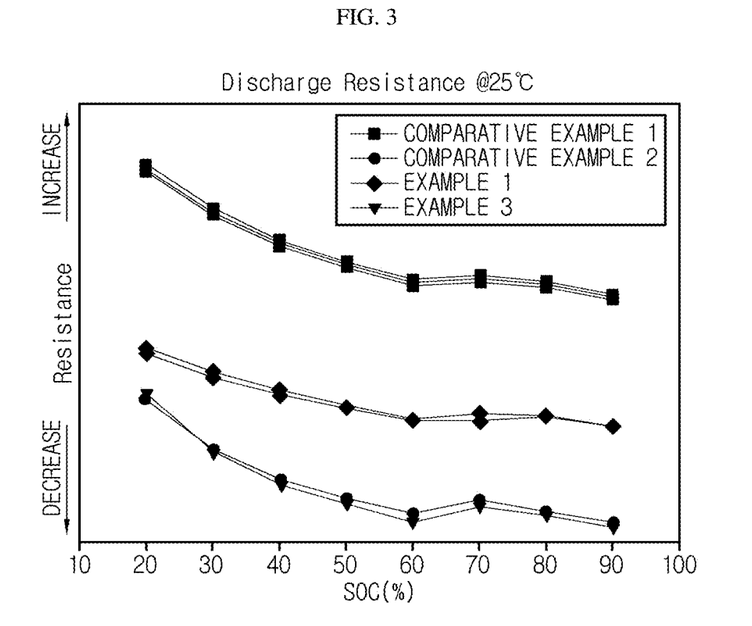
FIG. 3 is a graph showing resistances of monocells according to examples and comparative examples, measured at 25° C. under a 10 C discharge condition.
Figure 4:
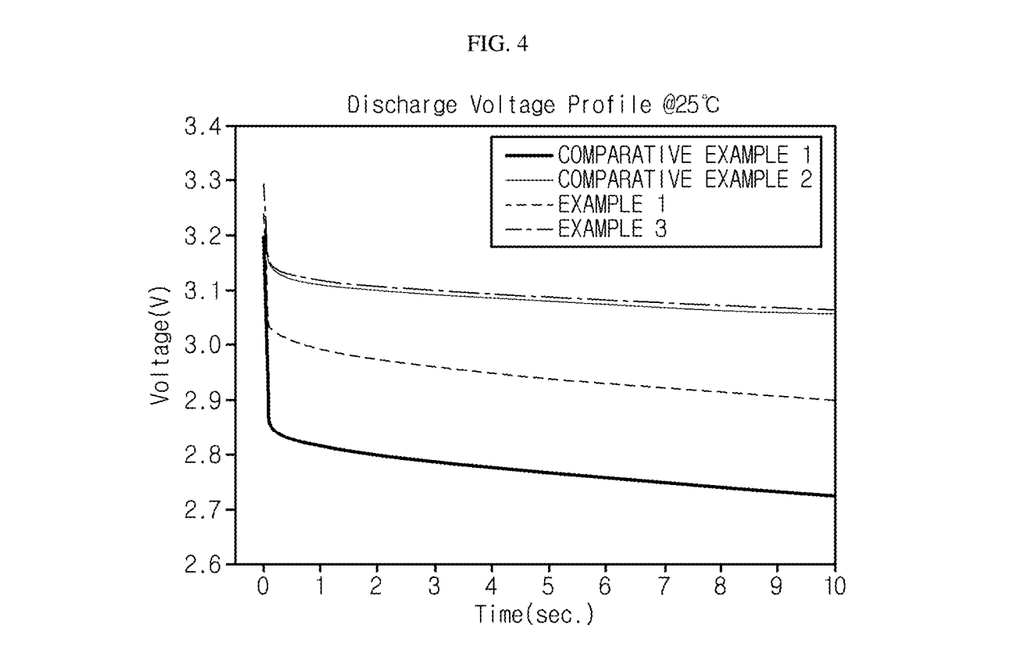
FIG. 4 is a graph showing voltages of the monocells according to the examples and the comparative examples, measured at 25° C. under a 10 C pulse discharge condition.
Figure 5:
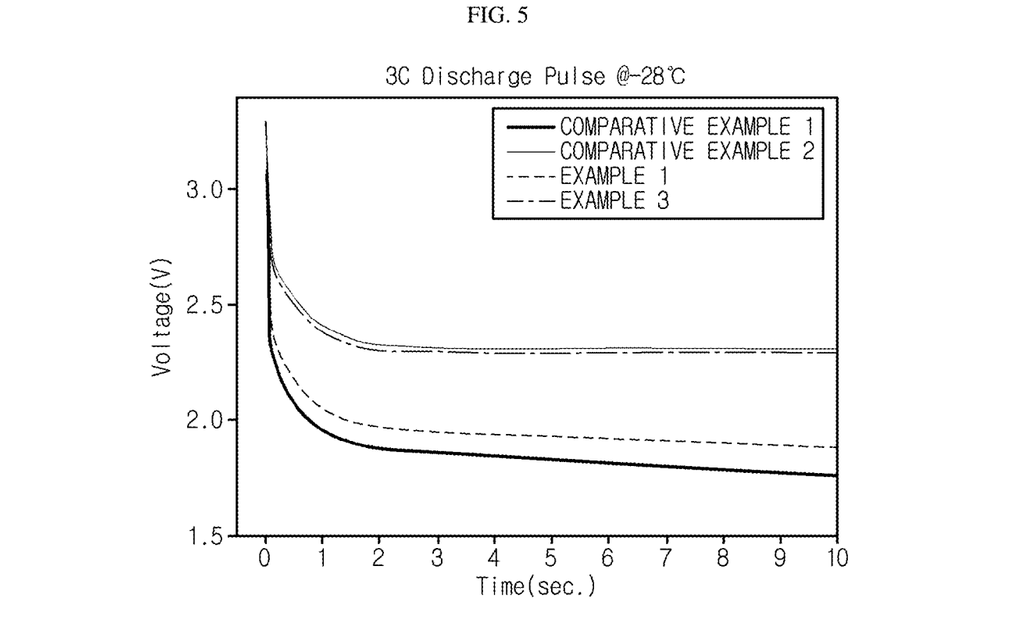
FIG. 5 is a graph showing voltages of the monocells according to the examples and the comparative examples, measured at −28° C. under a 3 C pulse discharge condition.

Monocells were prepared using the positive electrodes prepared according to Examples 1 to 3 and Comparative Examples 1 and 2. The prepared monocells were subjected to 10 C and 3 C pulse discharges (10 secs) at 25° C. and −28° C., respectively. The resistance measured at 25° C. under the 10 C discharge condition is shown in FIG. 3, and the voltage measured under the same condition is shown in FIG. 4. The voltage measured at −28° C. under the 3 C pulse discharge condition is shown in FIG. 5.

High Temperature Storage Test

Figure 6:
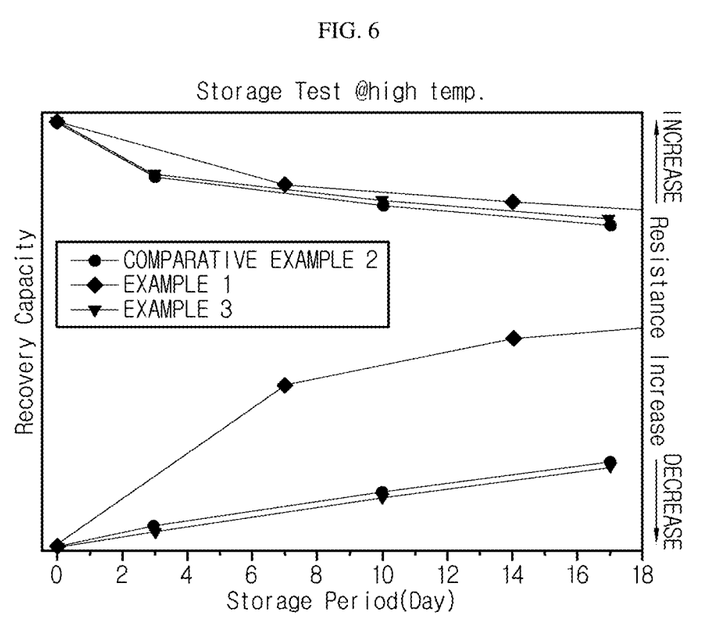
FIG. 6 is a graph showing differences in discharge capacities and pulse discharge resistances of the monocells according to the examples and the comparative examples, measured before and after high-temperature storage.

By using the monocells prepared according to Examples 1 to 3 and Comparative Examples 1 and 2, differences in discharge capacities and pulse discharge resistances before and after high temperature storage were measured. The measurement results are shown in FIG. 6. The high temperature storage was performed in a fully charged state.

What is claimed is:

1. A positive electrode for a lithium secondary battery, comprising:
    a positive electrode current collector comprising aluminum;
    a primer coating layer consisting essentially of a first polymer binder and a first conductive material, having surface roughness ($R_a$) of 90 nm to 200 nm and formed on at least one surface of the positive electrode current collector; and
    a positive electrode mixture layer formed on a surface of the primer coating layer opposite from the current collector and including a positive electrode active material containing secondary particles with a compressive breaking strength of 1 to 15 MPa, a second polymer binder and a second conductive material.

2. The positive electrode for a lithium secondary battery according to claim 1,
    wherein the secondary particles have a compressive breaking strength of 4 to 11 MPa.

3. The positive electrode for a lithium secondary battery according to claim 1,
    wherein the secondary particles are aggregates of primary particles, the primary particles have an average particle diameter of 0.2 to 1.0 μm, and the secondary particles have an average particle diameter of 3.1 to 22.4 μm.

4. The positive electrode for a lithium secondary battery according to claim 1,
    wherein the primer coating layer has a thickness of 0.3 μm to 1 μm.

5. The positive electrode for a lithium secondary battery according to claim 1,
    wherein the first conductive material and the first polymer binder are included at a weight ratio of 0.8:1 to 2:1.

6. The positive electrode for a lithium secondary battery according to claim 1,
    wherein the first polymer binder is an acrylate-based polymer.

7. The positive electrode for a lithium secondary battery according to claim 1,
    wherein the second polymer binder is at least one selected from the group consisting of polyvinylidene fluoride-hexafluoropropylene, polyvinylidene fluoride, polyacrylonitrile, polymethyl methacrylate, styrene-butadiene rubber and carboxymethyl cellulose.

8. The positive electrode for a lithium secondary battery according to claim 1,
    wherein the first conductive material is a carbon-based material.

9. The positive electrode for a lithium secondary battery according to claim 1,
    wherein the positive electrode mixture layer has a compressive density of 1.8 $g/cm^3$ to 4.4 $g/cm^3$.

10. A method for preparing a positive electrode for a lithium secondary battery, comprising:
    preparing slurry for forming a primer coating layer, which includes a first polymer binder, a first conductive material and a first solvent;
    preparing a positive electrode active material slurry including a second polymer binder, a positive electrode active material containing secondary particles with a compressive breaking strength of 1 to 15 MPa, a second conductive material, and a second solvent;
    forming a primer coating layer having a surface roughness ($R_a$) of 90 nm to 200 nm consisting essentially of the first polymer binder and the first conductive material by coating and drying the slurry for forming a primer coating layer on at least one surface of the positive electrode current collector comprising aluminum; and
    forming a positive electrode active material layer by coating and drying the positive electrode active material slurry on a surface of the primer coating layer opposite from the current collector where the slurry for forming a primer coating layer is coated,
    wherein the first solvent is an organic solvent and the second solvent is a water-based solvent, or the first solvent is a water-based solvent and the second solvent is an organic solvent.

11. The method for preparing a positive electrode for a lithium secondary battery according to claim 10, wherein the organic solvent is at least one selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate and butyl propionate, and the water-based solvent is at least one selected from the group consisting of water, methanol, ethanol, ethylene glycol, diethylene glycol and glycerol.

\* \* \* \* \*